Feb. 23, 1937.  H. BRUNNER  2,071,495

SAND SPREADER

Filed Sept. 3, 1935

INVENTOR.
Herman Brunner
BY
ATTORNEYS.

Patented Feb. 23, 1937

2,071,495

UNITED STATES PATENT OFFICE 2,071,495

SAND SPREADER

Herman Brunner, Waterford, Wis.

Application September 3, 1935, Serial No. 38,874

2 Claims. (Cl. 275—14)

This invention relates to machines for spreading or scattering sand or other loose materials.

An object of the present invention is to provide a simple and improved spreading or scattering device for the purpose mentioned.

Other objects and advantages will appear, expressed or implied, from the following description of an illustrative embodiment of the present invention.

In the accompanying drawing:—

Figure 1:
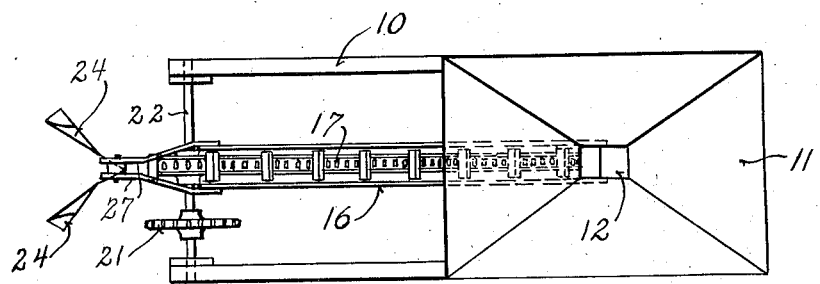
Figure 1 is a plan view of a sand spreader constructed in accordance with the present invention.
Figure 2:
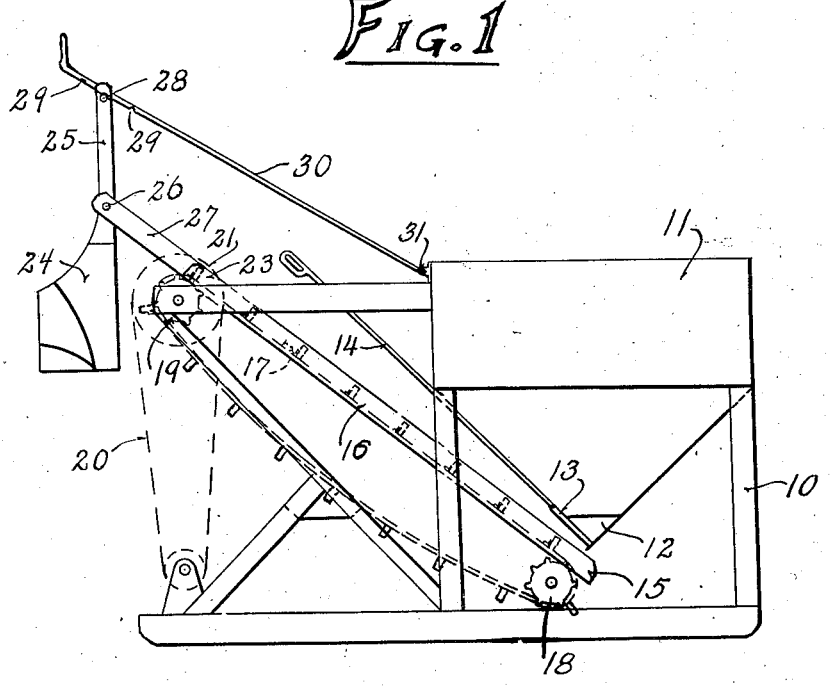
Fig. 2 is a side elevation.

The device selected for illustration comprises an appropriate frame 10, which may be mounted upon a truck or other appropriate vehicle, and which supports a suitable hopper 11 to receive a supply of sand or other material to be spread or scattered.

The hopper shown is provided with a conventional discharge opening 12 in the bottom thereof controlled by a gate 13, preferably of the sliding type, the gate being controlled by an appropriate handle 14.

The hopper 11 discharges into the lower end 15 of an appropriate conveyor which extends upwards from a point beneath the gate 13. The conveyor shown comprises an inclined trough 16 and an endless conveyor chain 17, the upper run of which extends lengthwise through the trough. The chain 17 is carried by conventional sprockets 18 and 19 and is driven by a chain 20 and sprocket 21, the latter being fixed to the shaft 22 to which the sprocket 19 is fixed.

From the upper end 23 of the conveyor the sand or other material to be scattered is projected against a pair of divergent deflector plates or vanes 24 arranged to throw the material laterally in opposite directions.

In this instance the vanes are carried at the lower end of an arm 25 rockably supported upon a pivot pin 26 between a pair of brackets 27 fixed to the end of the trough 16. The arm 25 is adjustably fixed in any of a plurality of positions by appropriate means, such as a pin 28 carried by the upper end of the arm and engageable with any of a plurality of notches 29 in a bar 30 secured to and projecting from a suitable support 31 on the hopper.

The arrangement is such that sand or the like discharged from the hopper 11 into the conveyor 16 is carried upwardly and projected from the upper end 23 thereof toward and against the vanes 24 which deflect it laterally and spread it in opposite directions. The rate of sand thus spread may be regulated by adjustment of the gate 13 and the distance which the sand is thrown laterally may be regulated by adjusting the vanes 24 and 25 about the pivot 26.

Various changes may be made in the embodiment of the invention hereinabove specifically described without departing from or sacrificing the invention as defined in the appended claims.

I claim:—

1. In a device for spreading loose materials the combination of a fixed deflector having a pair of divergent surfaces, a hopper having an outlet, means for regulating the discharge through said outlet, an endless chain conveyor disposed to receive materials directly from said outlet to carry same upward and away from said outlet and to throw same forcibly outward against said deflector surfaces to thereby spread same in opposite directions, and means for adjusting said deflector toward and from said conveyor to regulate the spreading action thereof.

2. In a device for spreading loose materials, the combination of a deflector having a pair of divergent surfaces, a hopper having an outlet, means for regulating the discharge through said outlet, an endless chain conveyor in an inclined trough, said conveyor disposed to receive materials directly from said outlet and to throw the same forcibly outward against said deflector surfaces to thereby spread the same laterally in opposite directions, said deflector being mounted on the lower end of an upright arm rockably supported intermediate its ends by a pair of brackets fixed to the end of said conveyor trough, a pin at the upper end of said deflector arm, and a moveable rod variously engageable with said pin to adjust the position of said deflector in relation to said conveyor and thereby regulate the spreading action thereof.

HERMAN BRUNNER.